May 26, 1970 N. A. BETZ ET AL 3,514,763
TOTALIZING MEMORY FOR MULTICHANNEL ANALYZERS WITH INCREASED CAPACITY
Filed March 12, 1969
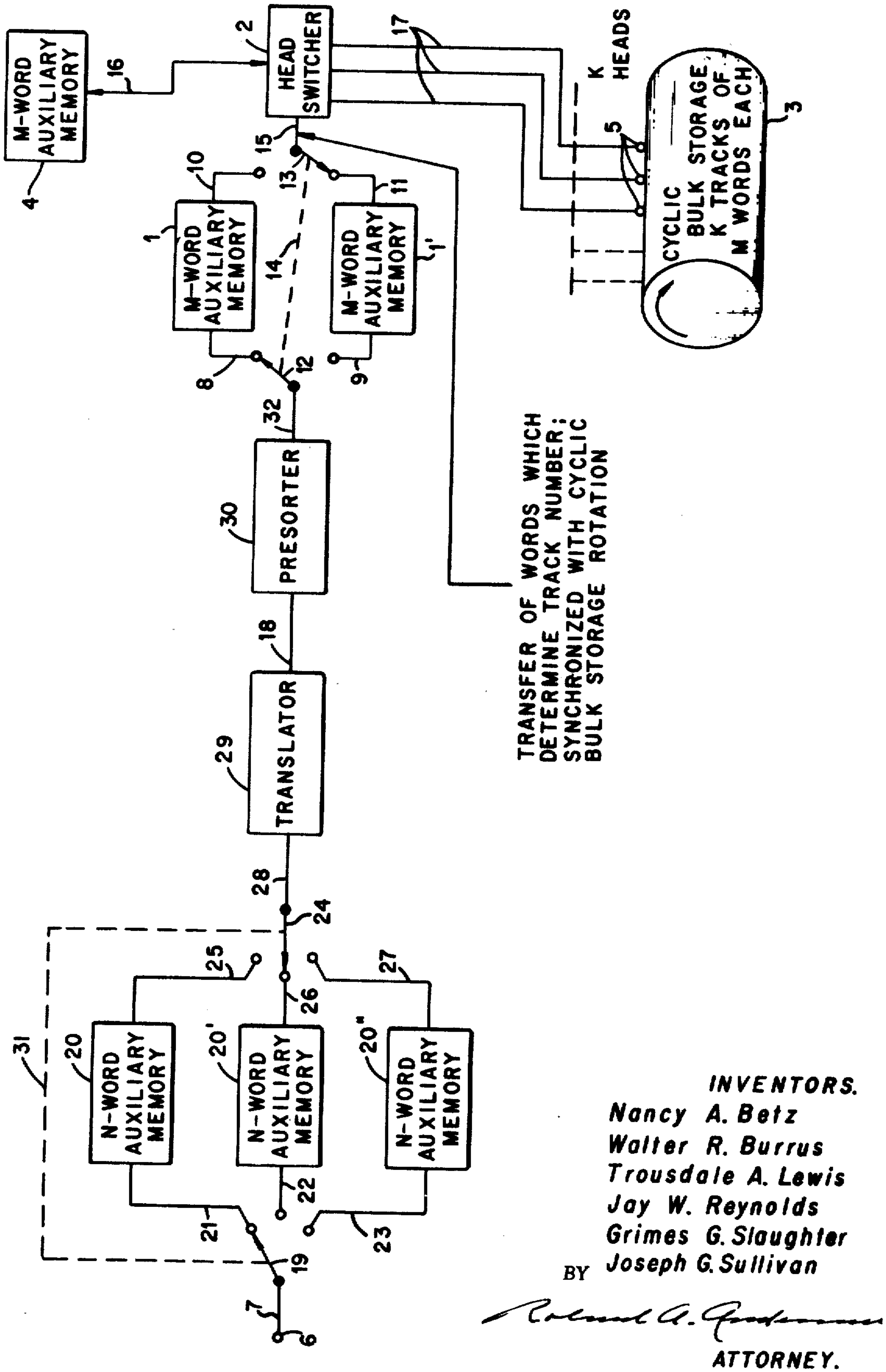
INVENTORS.
Nancy A. Betz
Walter R. Burrus
Trousdale A. Lewis
Jay W. Reynolds
Grimes G. Slaughter
BY Joseph G. Sullivan
ATTORNEY.

3,514,763

TOTALIZING MEMORY FOR MULTICHANNEL ANALYZERS WITH INCREASED CAPACITY

Nancy A. Betz, and Walter R. Burrus, Oak Ridge, Trousdale A. Lewis, Knoxville, and Jay W. Reynolds, Grimes G. Slaughter, and Joseph G. Sullivan, Oak Ridge, Tenn., assignors to the United States of America, as represented by the United States Atomic Energy Commission

Continuation-in-part of application Ser. No. 698,338, Jan. 16, 1968. This application Mar. 12, 1969, Ser. No. 806,648
Int. Cl. G06f *7/06, 7/08*
U.S. Cl. 340—172.5 5 Claims

ABSTRACT OF THE DISCLOSURE

In an incrementing memory system for data rates of $10^4$ words per second with a channel capacity of about $10^6$, externally supplied digitized events are continuously stored in auxiliary memory units and thereafter periodically reduced to a track position and head number which uniquely defines an address of a cyclic bulk storage unit. A presorter uses the track position so as to determine where in other auxiliary storage units the head number is to be stored. These second storage units batch the information and periodically activate all appropriate heads of a cyclic bulk storage unit so as to permit readout of stored information, incrementing of the same, and re-storage of the incremented information in a total elapsed time equivalent to two effective cycles of the bulk storage unit. Thus the number of random occurrences of a data word is totalized rather than storing the words themselves.

CROSS-REFERENCE TO RELATED APPLICATION

The present application is a continuation-in-part of U.S. application Ser. No. 698,338, filed Jan. 16, 1968, and having a common assignee therewith.

BACKGROUND OF THE INVENTION

The invention described herein was made in the course of, or under, a contract with the U.S. Atomic Energy Commission.

In many data handling systems, raw experimental data are processed by a digitizer, such as a pulse height analyzer. The raw data may be obtained, for example, from scintillation counting, Mossbauer analysis, time-of-flight spectroscopy, etc. The output from the digitizer could be a series of random numbers or data words, as a function of time, with each number relating to the height of a pulse or the duration of a time interval. These numbers must be analyzed for an understanding of the processes which generate the data. In the handling of such data, it is necessary, for example, to know how many times a particular output word is generated by the digitizer, i.e., the totalizing of the events in a "channel."

The development of prior data handling devices has progressed from those involving one channel up to those of several tens of thousands of channels. Various basic types of data handling devices have been and are being utilized and include magnetic core analyzers with speeds of up to $10^5$ data words/second, but which, for a large number of channels, are very expensive. For example, a $10^6$ channel magnetic core unit would cost in excess of $400,000. A rotating magnetic storage unit, which has a substantially lower cost per channel, has been heretofore limited in its speed of accumulating random data to the rotating rate, e.g., about 30 counts/second. This is substantially below the desired 10,000 counts/second. The relatively slow counting of such a prior device is a result of handling only one word per revolution. Thus, there exists a need for a high capacity data handling system wherein the counting speed thereof can be substantially increased, while at the same time minimizing the initial cost of such a system.

SUMMARY OF THE INVENTION

With a knowledge of the above limitations of the prior art, it is the object of the present invention to provide a data handling system which takes advantage of the lower cost of modern cyclic storage devices while at the same time providing means in the system to substantially increase the counting speed thereof so as to adequately handle information generated by contemporary nuclear instrumentation data generating circuits.

Some of the raw data for which an analysis thereof is desired include neutron cross-section measurements for nuclear reactor physics and designs, studies of the fission process, measurements for transplutonium isotopes, radiation chemistry studies, and solid state studies.

The above object has been accomplished in the present invention by utilizng a commercially available, rapid-access memory unit in combination with auxiliary storage memory units in such a manner that several hundred channels can be processed simultaneously and thus counting rates of several thousand per second can be achieved which match the output speeds of most nuclear instrumentation, which could not heretofore be achieved with prior devices.

BRIEF DECRIPTION OF THE DRAWING

The single figure in the drawing shows a block diagram of the system for accomplishing the above-mentioned object.

DECRIPTION OF THE PREFERRED EMBODIMENT

Referring now to the drawing, input events are fed from a digitizer, not shown, to an input terminal 6, and then by a multilead cable 7, switch 19, and one of multibit paths 21, 22, 23 into one of N-word auxiliary storage memory units 20, 20', 20''. The value of N, which will usually range between sixty-four and two hundred words, is determined by the input data rate, the effective cycle time of the cyclic bulk storage (described hereinafter), the logic of the cyclic bulk storage, the number of words per input event, and the number of auxiliary memory units used at the input. During the time that events are being stored in one unit, e.g., unit 20, events that were previously stored in another unit, e.g., unit 20', during a previous input cycle are read out via one of multibit paths 26, 27, switch 24, and multibit path 28 and are passed through to a transistor 29. Thus it can be seen that switch 19 is adapted to rotate among the multibit paths 21, 22, and 23 filling each auxiliary memory unit 20, 20', and 20'' in turn. Similarly, switch 24 may rotate among multibit paths 25, 26, and 27 to sequentially pass the events which are stored in the associated auxiliary memory units 20, 20', and 20'' to the translator 29 via multibit path 28. It should be understood that switch 19 is coupled to switch 24 by means of a coupling 31 (which may be mechanical, programmatic, or electronic) such that switches 19 and 24 are never connected to the same auxiliary memory unit. Each of the auxiliary memory units 20, 20', and 20'' is always in one of the three states: empty, being filled via connection of switch 19, or being emptied via connection of switch 24. When the memory unit being filled at any given time reaches the state of being full, it sends a signal to means, not shown, for effecting by means of the coupling 31 the repositioning of the switches 19 and 24 such that different ones of the memory units are then connected for being filled, emptied, or standing idle. It should be understood that the sequential switching of the switches 19 and 24 to their respective contacts may be controlled either by hardware or software components in a coventional manner.

The aforementioned translator 29 reduces input events of interest to addresses for the subsequent cyclic bulk storage 3. There is one word per address on the cyclic bulk storage. Each address, uniquely defined by a track position and a head number, from translator 29 goes through multibit path 18 to a presorter 30. The presorter 30 uses the track position of the address to determine where in an M-word auxiliary memory unit 1 or 1' (depending upon the position of switch 12) the head number of the address is to be stored. The value of M is equal to the number of positions in each track of the bulk storage unit 3. During the time that data are being stored in unit 1 through multibit path 32, switch 12, and multibit path 8, data that were previously stored in M-word auxiliary memory unit 1' are utilized to effect associated head switching circuitry 2 by means of a multibit path 11, switch 13, and a multilead cable 15. The switching circuitry 2 selects appropriate heads 5, by their associated leads 17, to effect the reading out of selected and associated channels of the bulk storage unit 3 onto a third M-word auxiliary memory unit 4 by means of a multilead cable 16, during one effective cycle on the unit 3. Each of the read-out channels is then incremented by the unit 4 and the unit 4 effects the re-recording of the new incremented values back onto the bulk storage unit 3 during the next effective cycle thereof in place of the previous values stored thereon.

At the end of the totalizing cycle, the positions of switches 12 and 13 are reversed and the stored data now in memory unit 1 are totalized by the units 2, 3, and 4 while additional addresses from the presorter 30 are now stored in auxiliary memory unit 1'. Switches 12 and 13 are coupled in a manner similar to switches 19 and 24 by means of a coupling 14. Thus the totalizing and batching cycles are continuously repeated in a rapid manner such that several hundred channels are processed for each two effective cycles of the unit 3, and counting rates of several thousand per second are achieved which can match the event rates of most nuclear experiments. It should be understood that the operation of switches 12 and 13 is not necessarily correlated to the operation of switch 19 at the input to the system.

The cyclic bulk storage unit 3 may be, for example, a rotary magnetic storage such as a disc or drum, or an acoustic delay line. Each track on the bulk storage unit is provided with at least one head for either reading the information stored on the drum or disc or recording new information thereon.

A typical disc-type storage unit 3 may be, for example, Model No. 13520 manufactured by the Digital Development Corporation, a subsidiary of the Xebec Corporation, San Diego, Calif. In such a unit, there are four discs provided, with each surface of each disc having 64 data tracks, or 128 tracks per disc. Thus the four discs provide up to 512 data tracks. Recording-reading heads are organized in groups of 64, and each group services one disc surface. Such a disc unit revolves at speeds up to 3600 r.p.m., and has a total rated capacity of $23.04 \times 10^6$ bits.

The auxiliary memory units 20, 20', and 20'', 1 and 1', as well as auxiliary storage memory unit 4 with its incrementing capability, may be a portion of the fast memory of any computer system which exercises control of the system. The head switcher 2 may be part of the cyclic storage controller and includes a track register to contain the addresses and a diode decoding matrix to select appropriate ones of the heads 5 to read out associated channels from the bulk storage unit 3. An example of a typical computer which can be utilized in the present invention is the General Purpose Digital Computer, Model SEL810B, manufactured by Systems Engineering Laboratories, Inc., Fort Lauderdale, Fla.

To illustrate the operation of the present invention, let it be assumed that ten events (rather than several hundred) have been read into auxiliary memory unit 20 and are to be accumulated by the system. Switch 19 is disconnected from multibit path 21 and switch 24 is connected to multibit path 25. Also, switch 12 is connected to multibit path 8, and switch 13 is disconnected from multibit path 10. Let it also be assumed that there are three words per event and sixteen bits per word; that there are 512 heads and 2048 track positions on the cyclic bulk storage unit 3.

Each event, 48 bits, is read out of auxiliary memory unit 20 and passed through the translator 29 which reduces it by means of a predetermined routine to an address (20 bits) corresponding to an address on unit 3. The said routine is a built-in part of the translator 29 and may differ or be changed for different experiments, but remains the same or constant for a given experiment. The routine may, for example, accept all pulse heights, but reject all times of flight which do not correspond to preselected regions of interest, such as a resonance. It may also increase channel widths for longer times of flight. The chronological output from the translator 29 for ten events, using the above routine, stated in track position head number, might be:

| | | | |
|---|---|---|---|
| $t_1$ | 137, 142 | $t_6$ | 212, 415 |
| $t_2$ | 212, 417 | $t_7$ | 42, 312 |
| $t_3$ | 142, 120 | $t_8$ | 152, 120 |
| $t_4$ | 1, 317 | $t_9$ | 317, 1 |
| $t_5$ | 500, 2 | $t_{10}$ | 500, 2 |

The presorter 30 takes each address in chronological order and stores the information in auxiliary memory unit 1 as follows: 142 is stored in location 137; 417 is stored in location 212; 120 is stored in location 142; etc. The location of a word in unit 1 gives the track position while the contents of nine bits of the word gives the head number. In other words, the presorter 30 sorts the addresses received from the translator 29 according to track position before being stored in auxiliary memory unit 1.

It should be noted that the numbers at $t_2$ and $t_6$ both require a count to be incremented at the 212th position, one in track No. 417 and one in track No. 415. This situation occurs at random times, depending upon the statistical distribution of input numbers. When this situation arises, it may be handled in two ways: omit the second number (at $t_6$) or save it until a later effective cycle. It would be feasible to increment both counts simultaneously using additional circuitry to give access to all heads simultaneously. This may be accomplished by storing both the track position and head number in auxiliary memory units 1 and 1'. The presorter 30 would then be replaced with a sorter which would store the cyclic bulk storage 3 addresses in ascending order of track position.

It should also be noted that $t_5$ and $t_{10}$ contain the same address. This situation can be handled in one of the above ways or the remaining seven bits of each word in unit 1 (or 1') can be used to contain the increment count for its address.

Returning to the operation, when the switches 12 and 13 are moved to their other positions, the numbers stored in auxiliary memory 1 activate appropriate heads 5 of the bulk storage unit 3 via the head switching unit 2 so that the stored information on the associated channels of unit 3, corresponding to the contents of auxiliary memory unit 1, is read into the auxiliary memory unit 4 during one effective cycle of bulk storage unit 3. Each word stored in unit 4 in this manner is then incremented and these incremented words are placed back on bulk storage unit 3 during the next effective cycle thereof. After this totalizing cycle has been completed, the switches 12 and 13 are again moved to their other positions and a new totalizing cycle is begun with the information now stored in the memory unit 1'.

The actuation of switches 12 and 13 to their alternate positions is synchronized with the effective cycling of unit 3 such that the positions of the switches 12 and 13 are changed for each two effective cycles of unit 3. Using an effective cycle rate of 60 times per second for unit 3, it can be seen that the switches 12 and 13 change their positions 30 times each second such that with the system of the present invention at least 10,000 counts/second can be stored or totalized on the unit 3, which is substantially above the 30 counts/second achievable with similar prior devices. The rate at which counts can be stored may be increased by employing more than one head per track, together with associated circuitry and logic, and arranging them so that the effective cycle time may be reduced in direct proportion to the number of heads per track.

It should be understod that the present invention is primarily concerned with the rapid acquisition of data. The final analysis of the acquired data may be analyzed by a large computer facility such as an IBM 360/75 computer, for example.

The cost of the data acquisition system of the present invention is about one-eighth of the cost of the above-mentioned $10^6$ channel magnetic core analyzer.

This invention has been described by way of illustration rather than limitation and it should be apparent that it is equally applicable in fields other than those described.

What is claimed is:

1. An improved system for the rapid acquisition of data comprising a cyclic bulk storage unit for storing at least $10^5$ words, said storage unit being provided with a plurality of fixed read-write heads; a first auxiliary memory unit; a second auxiliary memory unit; a third auxiliary memory unit; an input terminal for receiving input events from a digitizer; a translator means; a first switching means for sequentially connecting said input terminal to each of said auxiliary memory units for sequentially filling each of said memory units; a second switching means coupled to said first switching means for sequentially coupling the outputs of said memory units to said translator means such that different ones of said memory units are coupled to said input terminal and to said translator means at any given time; said translator means reducing input events of interest from one of said memory units to addresses which are defined by track positions and head numbers in accordance with a fixed predetermined routine; a presorter means coupled to the output of said translator means; a fourth auxiliary memory unit; a fifth auxiliary memory unit; a head switching circuitry associated with said heads of said bulk storage unit; a third switching means connecting the output of said presorter means to one of said fourth and fifth auxiliary memory units; a fourth switching means; means for coupling said fourth switching means to said third switching means, said fourth switching means connecting the other of said fourth and fifth memory units to said head switching circuitry; said coupling means between said third and fourth switching means being adapted to periodically reverse the positions of said last named connections such that the connections of said fourth and fifth auxiliary memory units to said presorter means and to said head switching circuitry are alternately reversed after each two effective cycles of said bulk storage unit; said presorter means utilizing the track position of each address received from said translator means to determine where in one of said selected fourth and fifth auxiliary memory units the head number of said each address is to be stored; a sixth auxiliary memory unit provided with incrementing capability; means for connecting said sixth auxiliary memory unit to said head switching circuitry; each of said fourth and fifth auxiliary memory units including means, during the time each is connected to said head switching circuitry, for effecting the actuation of a plurality of said heads as a function of the number of addresses stored in the then-connected auxiliary memory unit to effect the reading out of corresponding channels from said bulk storage unit onto said sixth auxiliary memory unit by said connecting means between said head switching circuitry and said sixth auxiliary memory unit during one effective cycle of said bulk storage unit; said sixth auxiliary memory unit including means for incrementing each of said read-out channels and then effecting the re-recording of each of said incremented channels back onto said bulk storage unit during the next effective cycle thereof, whereby as one of said fourth and fifth auxiliary memory units is batching input data from said presorter means, the other of said fourth and fifth memory units in conjunction with said head switching circuitry and said sixth auxiliary memory unit is effecting the totalizing of stored data therein onto said bulk storage unit.

2. The system set forth in claim 1, wherein said input events are totalized by said system at a rate of at least 10,000 counts per second.

3. The system set forth in claim 2, wherein said bulk storage unit is a drum type.

4. The system set forth in claim 2, wherein said bulk storage unit is a disc type.

5. A method for the rapid acquisition of data comprising the steps of storing several hundred input events in a first auxiliary storage device of a general purpose digital computer, reducing selected ones of said input events to addresses which are defined by track positions and head numbers in a translator, presorting each of said addresses in a presorter and storing the head number of each address in a second auxiliary storage device of said computer, reading several hundred corresponding channels by respective reading-writing heads from a bulk storage unit corresponding to the head number of each address stored in said second auxiliary storage device during one effective cycle of said unit, storing and incrementing the number read from each channel in a third auxiliary storage device of said computer, and recording by said reading-writing heads the several hundred incremented channels onto said bulk storage unit during the next effective cycle thereof, and repeating said steps as many times as desired.

References Cited

UNITED STATES PATENTS

| | | | |
|---|---|---|---|
| 3,341,818 | 9/1967 | Mackie et al. | 340—172.5 |
| 3,312,950 | 4/1967 | Hillman et al. | 340—172.5 |
| 3,020,525 | 2/1962 | Garrison et al. | 340—172.5 |
| 2,905,930 | 9/1959 | Golden | 340—172.5 |

GARETH D. SHAW, Primary Examiner